United States Patent [19]

Okita et al.

[11] Patent Number: 4,635,149
[45] Date of Patent: Jan. 6, 1987

[54] LOADING AND EJECTING MECHANISM IN A RECORDING AND REPRODUCING APPARATUS

[75] Inventors: Masao Okita, Furukawa; Kunihiko Gunji, Miyagi; Yukio Saito, Furukawa, all of Japan

[73] Assignee: Alps Electric Co., Ltd., Japan

[21] Appl. No.: 620,912

[22] Filed: Jun. 15, 1984

[30] Foreign Application Priority Data

Jun. 15, 1983 [JP] Japan .............................. 58-90499[U]
Jun. 15, 1983 [JP] Japan .............................. 58-90500[U]

[51] Int. Cl.⁴ ............................................. G11B 17/02
[52] U.S. Cl. ....................................................... 360/97
[58] Field of Search ...................................... 360/97–99

[56] References Cited

U.S. PATENT DOCUMENTS

4,539,613  9/1985  Suyama et al. ...................... 360/133

Primary Examiner—Robert S. Tupper
Attorney, Agent, or Firm—Guy W. Shoup

[57] ABSTRACT

A recording and reproducing apparatus for a disk cartridge comprises a cartridge holder for holding the disk cartridge which is movable between an eject position and a loading position. A load lever is provided for resiliently urging the cartridge holder toward the loading position, and a movable lock member engageable with the load lever keeps the cartridge holder in the eject position. A cam plate is resiliently urged forwardly and is movable rearwardly by abutting engagement with the disk cartridge. The cam plate has a first engagement portion, and a lock lever has a second engagement portion engageable with the first engagement portion to hold the cam plate in its rearward position. A solenoid energizable in response to an eject signal moves the lock lever to bring the second engagement portion out of engagement with the first engagement portion of the cam plate, and an eject lever engageable by the inserted disk cartridge serves to eject the disk cartridge. The cam plate has a release member for releasing the load lever from engagement with the lock member to allow the cartridge holder to move to the loading position and a cam surface for causing the load lever to move the cartridge holder from the loading position back to the eject position.

8 Claims, 7 Drawing Figures

LOADING AND EJECTING MECHANISM IN A RECORDING AND REPRODUCING APPARATUS

BACKGROUND OF THE INVENTION

The present invention relates to an apparatus for recording information on a magnetic disk contained within a disk cartridge, and reproducing information recorded on such disks.

Prior recording and reproducing apparatus of the type described have an eject mechanism for ejecting a magnetic disk cartridge by generally utilizing the rotative power from a speed reduction device connected to a motor. The construction of the eject mechanism, including the speed reduction device, is complex, large in size, and of an increased thickness. Additionally, the complexity of the conventional eject mechanism reduces its reliability and often the disk cartridge cannot easily be taken out of the recording and reproducing apparatus.

SUMMARY OF THE INVENTION

With the prior drawbacks in view, it is an object of the present invention to provide a disk cartridge recording and reproducing apparatus which is simpler in construction, smaller in size, lower in profile, and highly reliable so that the disk cartridge can reliably be removed.

Another object of the present invention is to provide a disk cartridge recording and reproducing apparatus capable of loading and ejecting disk cartridges without fail.

According to the present invention, there is provided a recording and reproducing apparatus for a disk cartridge, comprising a cartridge holder for holding the disk cartridge and movable between an eject position and a loading position. A load lever is provided for resiliently urging the cartridge holder toward the loading position, and a movable lock member is engageable with the load lever for keeping the cartridge holder in the eject position. A cam plate is resiliently urged forwardly and is movable rearwardly by abutting engagement with the disk cartridge. The cam plate has a first engagement portion engageable with a second engagement portion of a lock lever, and a soleniod energizable in response to an eject signal is provided for moving the lock lever to bring the second engagement portion out of engagement with the first engagement portion of the cam plate to allow the cam plate to move forwardly. An eject lever is engaged by the inserted disk cartridge for storing a force to eject the disk cartridge, and the cam plate has a release member for releasing the load lever from engagement with the lock member to allow the cartridge holder to move the loading position and a cam surface for causing the load lever to move the cartridge holder from the loading position back to the eject position.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
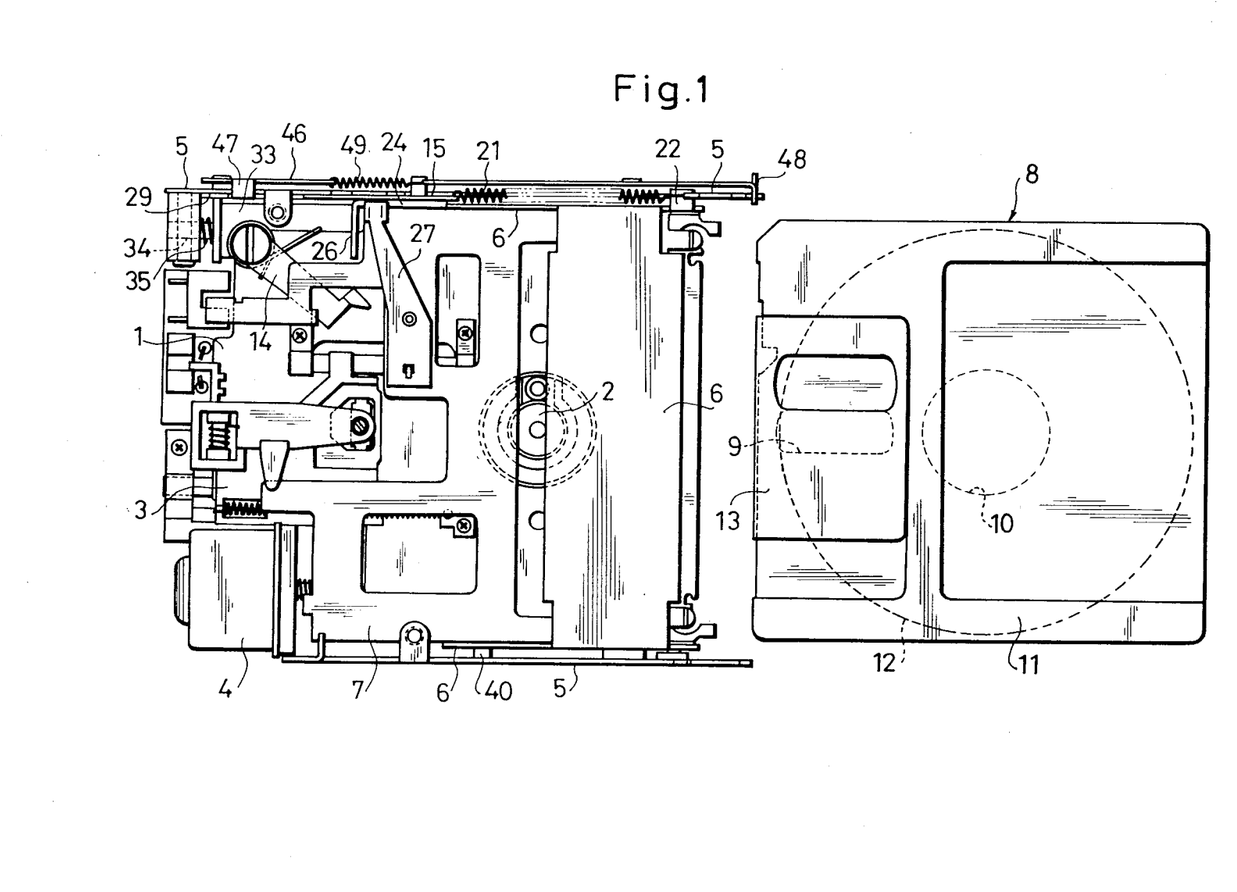
FIG. 1 is a plan view of a magnetic disk cartridge, and a recording and reproducing apparatus of the present invention prior to insertion of the magnetic disk cartridge.
Figure 2:
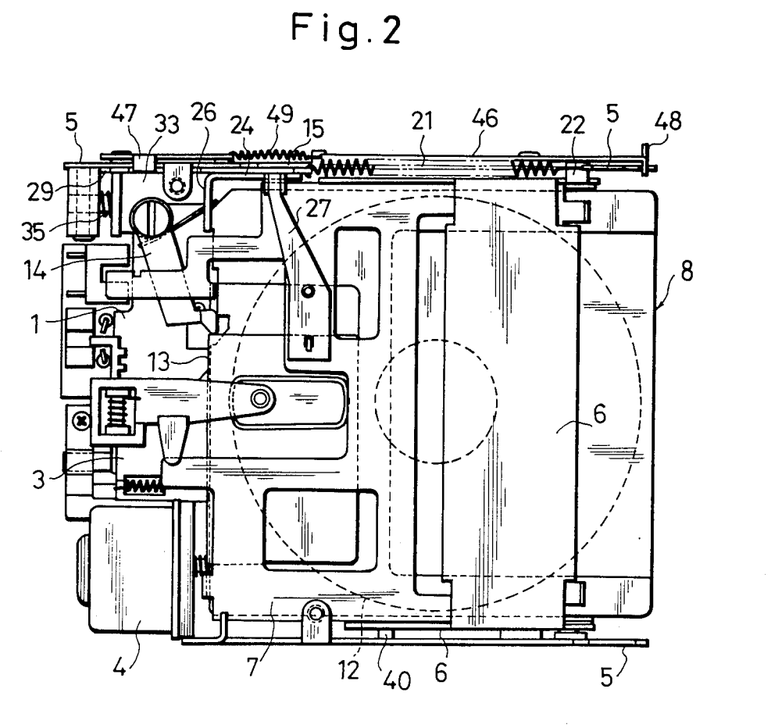
FIG. 2 is a plan view of the recording and reproducing apparatus of FIG. 1 with the magnetic disk cartridge inserted therein.

As shown in FIG. 1, a recording and reproducing apparatus includes a frame 1 on which are mounted a disk rotation shaft 2, a carriage 3 supporting a magnetic head and a pad, and a stepping motor 4 for moving the carriage 3.

A pair of side plates 5 are screwed to opposite sides of the frame 1. A cartridge holder 7 is mounted by a load lever 6 on the inner side of one of the side plates 5 and extends over the disk rotation shaft 2. Although not shown, the cartridge holder 7 has a cartridge insertion slot defined in a righthand end thereof for insertion therethrough a magnetic disk cartridge 8 toward the carriage 3.

The magnetic disk cartridge 8 comprises a case 11 molded of hard synthetic resin and having an insertion hole 9 for the magnetic head carried on the carriage 3, and a hole 10 for receiving the shaft 2. A magnetic disk 12 is rotatably housed in the case 11, and a shutter 13 is provided for covering the hole 9 in the case 11 when the cartridge 8 is removed from the apparatus. Between one of the side plates 5, i.e. the upper side plate shown in FIG. 1, and the carriage 3, there is disposed an eject lever 14 for opening the shutter 13 and storing a force to eject the disk cartridge 8.

Figure 3:
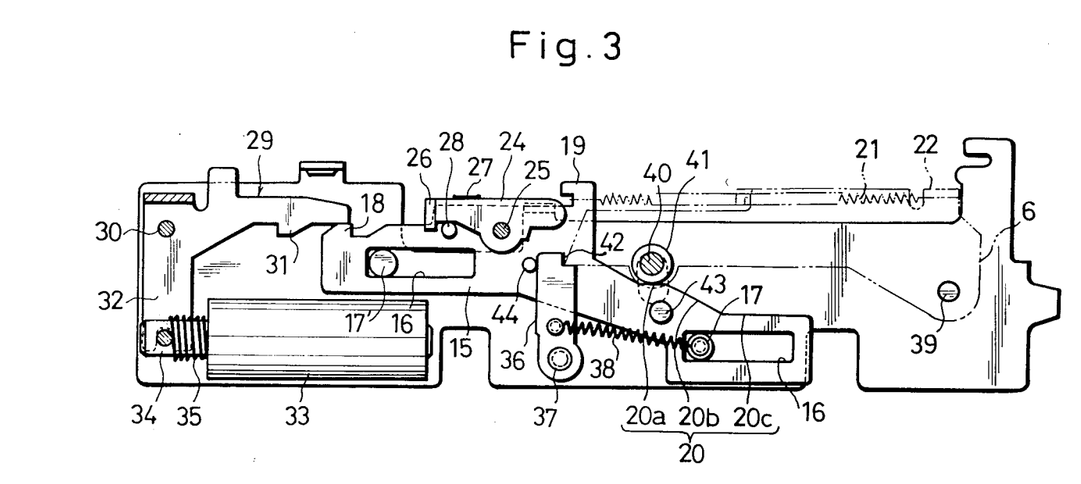
FIGS. 3 and 4 are side elevational views of a side plate showing an inner side thereof and the manner in which a cam plate operates.
Figure 4:
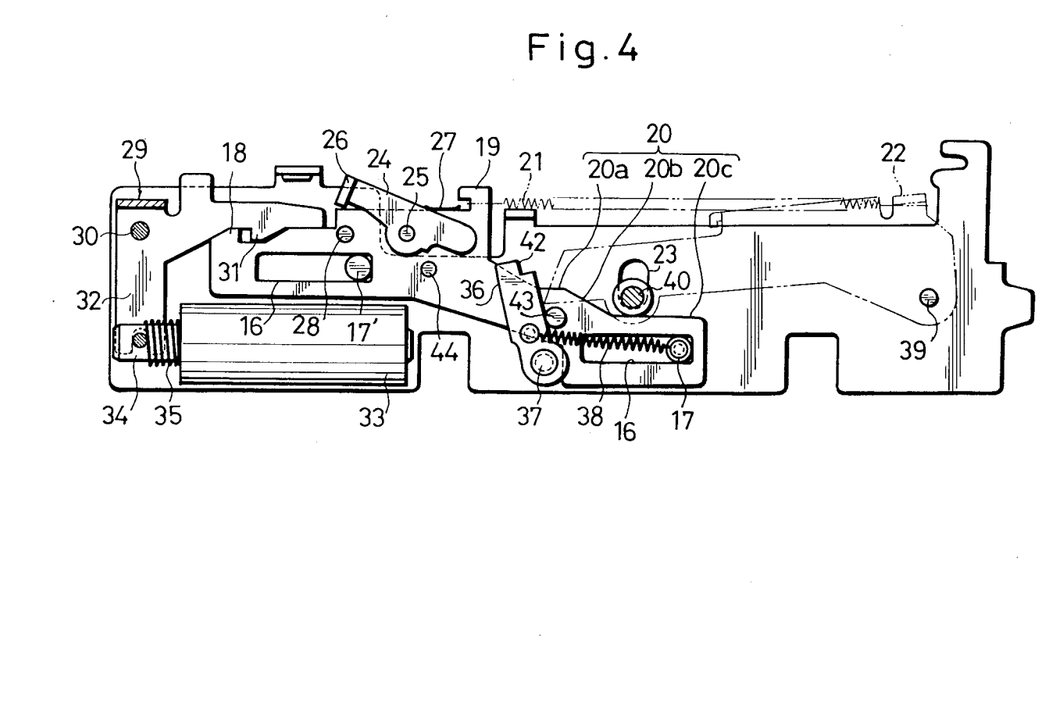

A cam plate 15 is attached to the inner side of the upper side plate 5 so as to be slidable in the longitudinal direction therealong. More specifically, as shown in FIGS. 3 and 4, the cam plate 15 has two slots 16 in which respective pins 17 and 17' on the side plate 5 are inserted for slidably supporting the cam plate 15. The cam plate 15 has an engagement pawl 18 on the inner end thereof, a spring hook 19, and a cam surface 20 on the forward end. A tension spring 21 has one end engaging the spring hook 19 and the other end engaging a spring hook 22 on the load lever 6. The cam plate 15 is normally urged resiliently to move forwardly towards the cartridge insertion slot. The cam surface 20 is comprised of an upper flat edge 20a, a slanted edge 20b, and a lower flat edge 20c. The side plate 5 has a vertically elongate hole 23 defined therein in confronting relation to the cam surface 20. Although not illustrated, the other side plate 5 has a similar vertically elongate hole in confronting relation to the hole 23.

A swing lever 24 is supported for angular movement by a shaft 25 carried by the cam plate and extending through the vicinity of an upper central edge of the swing lever 24. The swing lever 24 has a hook-shaped abutment end 26 for abutting engagement with a leading edge of the magnetic disk cartridge 8. A leaf spring 27 is staked on the upper surface of the cartridge holder 7 and has a distal end resiliently held against the swing lever 24. A stop 28 projects from the cam plate 15. The swing lever 24 is normally held in abutment against the stop 28 and prevented from angularly moving downwardly beyond a horizontal position by the stop 28.

A lock lever 29 is pivotally supported by a support pin 30 on the inner side of the side plate 5 for coaction with the cam plate 15. The lock lever 29 has an end portion thereof an engagement pawl 31 engageable with the engagement pawl 18 on the cam plate 15 and also has an opposite dependent end 32 coupled to an armature 34 of a solenoid 33. The lock lever 29 is normally urged resiliently by a coil spring 35 disposed around the armature 34 to turn about the support pin 30 in a direction to bring the engagement pawl 31 into engagement with the engagement pawl 18.

A lock member 36 is pivotally mounted by a support shaft 37 on a central portion of the inner side of the side plate 5. A coil spring 38 is connected between the lock member 36 and the pin 17 and normally urges the lock member resiliently to turn forwardly toward the cartridge insertion slot.

The load lever 6 is pivotally mounted by support pins 39 carried by the respective side plates 5, and is normally urged resiliently by the tension spring 21 to turn about the support pins 39 in a downward direction, that is, toward a loading position. The load lever 6 and the cartridge holder 7 disposed inside thereof are pivotally interconnected by connector pins 40 having ends inserted respectively in the vertically elongate holes 23 in the two side plates 5. A roller 41 is loosely fitted over one of the connector pins 40 and held in contact with the cam surface 20. The load lever 6 has a distal end engageable with a step 42 on an upper end of the lock member 36. When the load lever 6 engages the steps 42 of the lock member 36, the load lever 6 is prevented from being turned to thereby keep the cartridge holder 7 in an eject position. A release pin 43 is mounted on an projects from the cam plate 15 for pushing the lock member 36 to disengage the step 42 from the load lever 6. The cam plate 15 also has an integral projection 44 for returning the step 42 back into engagement with the load lever 6.

Figure 7:
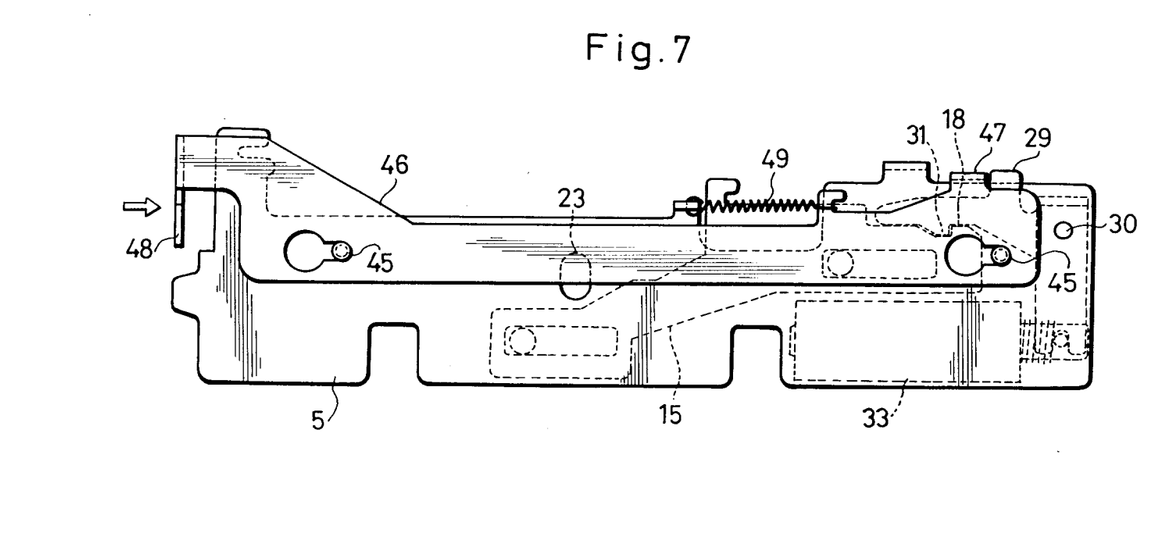
FIG. 7 is a side elevational view of the side plate illustrating an outer side thereof.

An illustrated FIG. 7, a pair of guide pins 45 spaced a suitable distance is mounted on and projects from the outer side of the side plate 5. An emergency eject lever 46 is slidably fitted over the guide pins 45. The emergency eject lever 46 has on an end thereof a pusher 47 engageable with the upper end of the lock lever 29 and on a forward end a hook-shaped bent portion 48 facing a hold (not shown) in a front panel of the recording and reproducing apparatus. A return spring 49 is connected between the emergency eject lever 46 and the side plate 5 for normally urging the emergency eject lever 46 resiliently toward the cartridge insertion slot.

Operation of the recording and reproducing apparatus before the magnetic disk cartridge 8 is loaded therein will be described.

Figure 5:
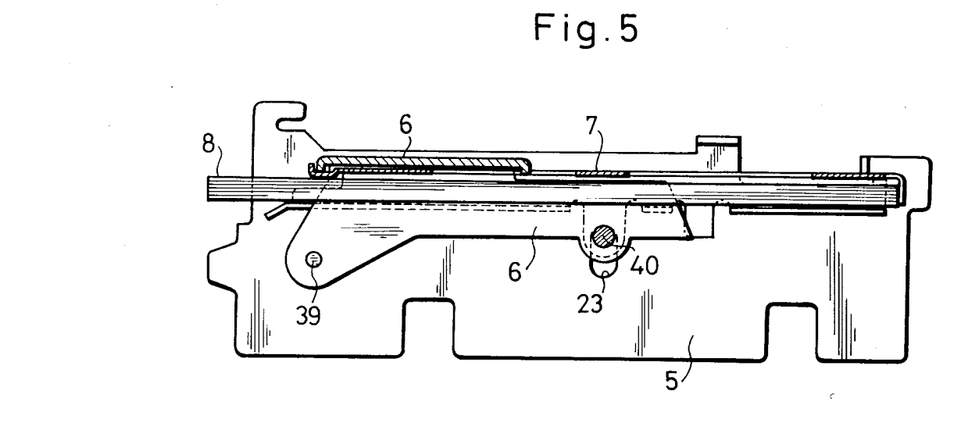
FIGS. 5 and 6 are side elevational views, partly in cross section, explanatory of operation of a load lever.
Figure 6:
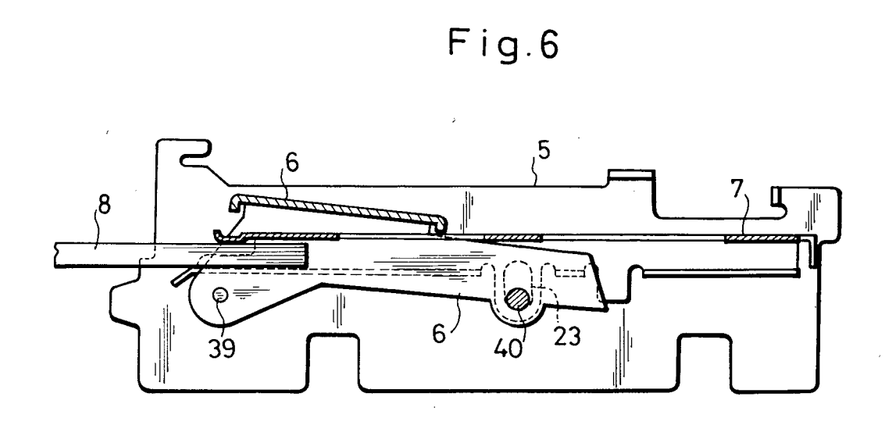

FIGS. 1, 3 and 5 illustrate the parts position prior to insertion of the magnetic disk cartridge 8. In this position, as shown in FIG. 3, the cam plate 15 is attracted forwardly toward the cartridge insertion slot under the force of the tension spring 21 with the upper flat edge 20a of the cam plate 15 facing the hole 23 in the side plate 5. Since the roller 41 now rides on the upper flat edge 20a, the load lever 6 is prevented from turning downwardly. The cartridge holder 7 is thus kept in a standby position or the eject position.

The solenoid 33 is not yet energized, and the lock lever 29 is held stopped in abutment against the cam plate 15 under the resilient force of the coil spring 35. Since the cam plate 15 has been attracted toward the cartridge insertion slot, as described above, the engagement pawl 18 of the cam plate 15 and the engagement pawl 31 of the lock lever 29 are spaced apart out of mutal meshing engagement with each other. The distal end of the load lever 6 is placed on the step 42 of the lock member 36 and prevented from turning downwardly. As shown in FIG. 1, the distal end of the eject lever 14 is directed forwardly toward the disk insertion slot. As illustrated in FIG. 3, the distal end of the leaf spring 27 is positioned between the shaft 25 and the abutment end 26 of the swing lever and urges the swing lever 24 in a direction to abut against the stop 28.

When the magnetic disk cartridge 8 is inserted into the cartridge holder 7, the distal end of the eject lever 14, at first, engages the edge of the shutter 13. Continued insertion of the magnetic disk cartridge 8 causes the eject lever 14 to turn clockwise as shown in FIG. 1 for thereby opening the shutter 13 to expose the magnetic head insertion hole.

During the process of inserting the magnetic disk cartridge 8, the leading edge thereof abuts against the abutment end 26 of the swing lever 24. As the magnetic disk cartridge 8 is pushed in further, the cam plate 15 is moved toward the lock lever 29 against the resiliency of the tension spring 21. The engagement pawl 18 of the cam plate 15 pushes up the engagement pawl 31 of the lock lever 29, and then the engagement pawl 31 falls downwardly to mesh with the engagement pawl 18, as shown in FIG. 4. The engagement between the pawls 18, 31 locks the cam plate 15 against movement back to the intitial position. As the cam plate 15 is pushed inwardly by the magnetic disk cartridge 8, the slant edge 20b of the cam surface 20 is brought into confronting relation to the hole 23 in the side wall 5. When the cam plate 15 is then locked as described above, the lower end portion of the slant edge 20b confronts the hole 23. Since the distal end of the load lever 6 is supported on the step 42 of the lock member 36 at the time the cam plate 15 is locked, the load lever 6 does not turn downwardly, and the cartridge holder 7 which is coupled to the load lever 6 by the connector pins 40 is kept in the initial eject position. Therefore, the roller 41 is positioned above the hole 23 in spaced relation to the slant edge 20b of the cam surface 20.

When the magnetic disk cartridge 8 is further inserted after the cam plate 15 has been locked, the release pin 43 pushes the lock member 36 to turn the latter as shown in FIG. 4. The turning movement of the lock member 36 causes the distal end of the load lever 6 to disengage from the step 42, whereupon the load lever 6 is turned downwardly (in a loading direction) about the support pin 39 under the tension of the tension spring 21. On the downward movement of the load lever 6, the connector pins 40 and the roller 41 descend in the holes 23 to lower the cartridge holder 7 toward the disk rotation shaft 2 until the magnetic disk cartridge 8 is positioned for recording and reproducing operation. At this time, the leaf spring 27 is resiliently held against the swing lever 24 at a position between the shaft 25 and the cartridge insertion slot. Therefore, and due to the fact that the cartridge holder 7 is lowered, the swing lever 24 is turned clockwise (FIG. 4) about the shaft 25 out of engagement with the leading edge of the magnetic disk cartridge 8. After the magnetic disk cartridge 9 has been loaded, the roller 41 is positioned on the lower flat edge 20c of the cam surface 20 as illustrated in FIG. 4.

Operation of the recording and reproducing apparatus for ejecting the magnetic disk cartridge 8 will be described below.

When the solenoid 33 is energized by an eject signal issued from a control unit (not shown), the armature 34 is pulled against the resiliency of the coil spring 35 to turn the lock lever 29 counterclockwise as shown in FIG. 4 until the pawls 18, 31 are disengaged from each other. The, the plate 15 is pulled back forwardly toward the cartridge insertion slot under the return force of the tension spring 21. As the cam plate 15 is thus moved forwardly, the roller 41 rolls up the slant edge 20b until finally it rides onto the upper flat edge 20a as shown in FIG. 3. As a result, the load lever 6 is turned upwardly against the resilient force from the tension spring 21 and brought into engagement again with the step 42 of the lock member 36 which is returned by coil spring 38 and the projection 44. The cartridge holder 7 with the magnetic disk cartridge 8 is raised from the loading position to the eject position. When the magnetic disk cartridge 8 is lifted to eject positions, the magnetic disk cartridge 8 is ejected from the cartridge holder 7 by the returning force of the eject lever 14 and the movement of the swing lever 24 toward the cartridge insertion slot due to the retraction of the cam plate 15. When the magnetic disk cartridge 8 has been ejected, the leaf spring 27 is positioned again between the shaft 25 and the abutment end 26, so that the swing lever 24 is resiliently urged by the leaf spring 27 to move in a direction to abut against the stop 28 in preparation for the loading of the magnetic disk cartridge 8.

If the solenoid 33 is not energized due to its malfunctioning or for some other reasons even when an eject signal is applied, then the magnetic disk cartridge 8 can be ejected by the emergency eject level 46. More specifically, as show in FIG. 7, the bent portion 48 of the emergency eject lever 46 is pushed in the direction the arrow against the resilient force of the return spring 49 until the pusher 47 abuts against the upper end of the lock lever 29 and turns the latter. Since the lock lever 29 is now actuated in the same manner as if the solenoid 33 were energized, the pawls 18, 31 are brought out of mutual engagement with each other to eject the magnetic disk cartridge 8.

With the foregoing arrangement of the present invention, the recording and reproducing apparatus is simpler in construction, less costly to manufacture, smaller in size, and lower in profile than conventional apparatus. When the apparatus suffers any trouble during operation, the lock lever coupled to the solenoid can be moved by the emergency eject lever to bring the cam plate and the lock lever out of engagement for ejecting the magnetic disk cartridge. Therefore, the apparatus of the invention can easily be handled and is highly reliable in operation.

When the disk cartridge is to be loaded, the swing level is urged by the leaf spring in a direction to abut against the disk cartridge, and the cam plate is reliable operated to allow the inserted disk cartridge to move to the loading position. In the loading position, the leaf spring urges the swing lever to move away from the loaded disk cartridge. Accordingly, the disk cartridge as it is ejected is not prevented by the swing lever from being discharged. The disk cartridge can therefore be loaded and ejected without fail.

Although a certain preferred embodiment has been shown and described, it should be understood that many changes and modifications may be made therein without departing from the scope of the appended claims.

What is claimed is:

1. A recording and reproducing apparatus for a disk cartridge, comprising:
    (a) means including a cartridge holder adapted to hold a disk cartridge for movement between a first position for moving said cartridge into and out of said apparatus and a second position in which a disk cartridge fully inserted in said cartridge holder is moved to engage a magnetic head in said apparatus, said cartridge holder having an insertion end disposed toward a forward end of said apparatus and a distal end disposed toward a rearward end of said apparatus;
    (b) means including a load lever mounting said cartridge holder for moving said cartridge holder between said first and second positions;
    (c) means including a movable lock member engageable with a distal end of said load lever for holding said cartridge holder in said first position prior to full insertion of said disk cartridge in said cartridge holder;
    (d) means including a cam plate resiliently urged by biasing means forwardly in said apparatus and movable rearwardly by abutting engagement with a disk cartridge inserted in said cartridge holder of said apparatus, said cam plate having a first engagement portion;
    (e) means including a lock lever in said apparatus having a second engagement portion, said second engagement portion being resiliently moved by said first engagement portion into engagement therewith when said cam plate is moved rearwardly for holding said cam plate in its rearward position when said disk cartridge has been fully inserted in said cartridge holder;
    (f) said cam plate having a release member for moving said lock lever to release said distal end of said load lever from engagement with said lock member when said cam plate is moved to its rearward position, thereby allowing said cartridge holder to move to said second position, and a cam surface engaging a member on said load lever for moving said cartridge holder from said second position back to said first position upon movement of said cam plate forwardly for ejection of said cartridge; and
    (g) means including a solenoid energizable in response to an eject signal for moving said lock lever to bring said second engagement portion out of engagement with said first engagement portion of said cam plate to allow said cam plate to move forwardly for ejection of said cartridge.

2. A recording and reproducing apparatus according to claim 1, wherein one end of said load lever disposed toward the forward end of the apparatus is pivotally mounted to a side wall of the apparatus and the opposite end of said load lever is pivotable for pivotally moving said cartridge between said first and second positions.

3. A recording and reproducing apparatus according to claim 1, wherein said cam plate includes a projection for returning said lock member to a position for holding the distal end of the load lever in the first position upon return movement of said cam plate forwardly in said apparatus.

4. A recording and reproducing apparatus according to claim 1, wherein said cam plate has a cam surface composed of an upper flat edge, a slant edge, and a lower flat.

5. A recording and reproducing apparatus for a disk cartridge, comprising:
(a) means including a cartridge holder adapted to hold a disk cartridge for movement between a first position for moving said cartridge into and out of said apparatus and a second position in which a disk cartridge fully inserted in said cartridge holder is moved to engage a magnetic head in said apparatus, said cartridge holder having an insertion end disposed toward a forward end of said apparatus and a distal end disposed toward a rearward end of said apparatus;
(b) means including a load lever mounting said cartridge holder for moving said cartridge holder between said first and second positions;
(c) means including a cam plate resiliently urged by biasing means forwardly in said apparatus and movable rearwardly by abutting engagement with a disk cartridge inserted in said cartridge holder of said apparatus, said cam plate having a cam surface for engaging a portion of said load lever for moving said cartridge holder between said first and second positions;
(d) means for releasably locking said cam plate against forward movement in said apparatus when said cam plate is moved to a rearward position by full insertion of a disk cartridge in said cartridge holder, whereby said disk cartridge thus inserted can be moved by said load lever from said first position to said second position, and upon release of said cam plate from said locking means, said cartridge can be moved from said second position to said first position by the return movement of said cam plate forwardly in said apparatus;
(e) means including a swing lever pivotally mounted on said cam plate and having an abutment end engageable in one position with a leading edge of an inserted disk cartridge for moving said cam plate rearwardly; and
(f) means including a leaf spring secured to said cartridge holder having a portion resiliently held in moving contact with said swing lever on said cam plate such that said swing lever is biased to dispose said abutment end in said one position prior to movement of said cam plate to said rearward position and to pivot said abutment end out of engagement with said disk cartridge when said cam plate has been moved to said rearward position.

6. A recording and reproducing apparatus according to claim 5, wherein one end of said load lever disposed toward the forward end of the apparatus is pivotally mounted to a side wall of the apparatus and the opposite end of said load lever is pivotable for pivotally moving said cartridge between said first and second positions.

7. A recording and reproducing apparatus according to claim 5, wherein said cam plate has a cam surface composed of an upper flat edge, a slant edge, and a lower flat edge.

8. A recording and reproducing apparatus according to claim 5, wherein said swing lever is prevented by a stop projecting on said cam plate from turning downwardly beyond a horizontal position.

* * * * *